United States Patent
Olszewski et al.

(10) Patent No.: US 8,504,540 B2
(45) Date of Patent: Aug. 6, 2013

(54) SCALABLE READER-WRITER LOCK

(75) Inventors: Marek K. Olszewski, Cambridge, MA (US); Yosef Lev, Cambridge, MA (US); Victor M. Luchangco, Cambridge, MA (US)

(73) Assignee: Oracle America, Inc., Redwood Shores, CA (US)

( * ) Notice: Subject to any disclaimer, the term of this patent is extended or adjusted under 35 U.S.C. 154(b) by 485 days.

(21) Appl. No.: 12/406,890

(22) Filed: Mar. 18, 2009

(65) Prior Publication Data

US 2010/0241774 A1    Sep. 23, 2010

(51) Int. Cl.
*G06F 17/30* (2006.01)

(52) U.S. Cl.
USPC ............ 707/704; 711/117; 711/145

(58) Field of Classification Search
USPC ............ 707/700–704; 710/200
See application file for complete search history.

(56) References Cited

U.S. PATENT DOCUMENTS

| | | | |
|---|---|---|---|
| 6,601,120 B1 * | 7/2003 | Schimmel | 710/107 |
| 6,823,511 B1 * | 11/2004 | McKenney et al. | 718/102 |
| 7,107,267 B2 * | 9/2006 | Taylor | 1/1 |
| 7,760,747 B2 * | 7/2010 | Dally et al. | 370/412 |
| 2002/0078284 A1 * | 6/2002 | McKenney | 710/200 |
| 2004/0117531 A1 * | 6/2004 | McKenney | 710/200 |
| 2005/0149634 A1 * | 7/2005 | McKenney | 709/248 |
| 2007/0239915 A1 * | 10/2007 | Saha et al. | 710/200 |
| 2008/0209433 A1 * | 8/2008 | McKenney | 718/104 |
| 2008/0256074 A1 * | 10/2008 | Lev et al. | 707/8 |
| 2008/0320262 A1 * | 12/2008 | McKenney et al. | 711/163 |
| 2009/0125548 A1 * | 5/2009 | Moir et al. | 707/103 R |
| 2009/0172306 A1 * | 7/2009 | Nussbaum et al. | 711/154 |
| 2010/0042997 A1 * | 2/2010 | Lev et al. | 718/100 |

OTHER PUBLICATIONS

Scalable Reader-Writer Synchronization for Shared-Memory Multiprocessors, ACM, 1991, pp. 106-113.*
SNZI: Scalable NonZero Indicators, Aug. 12-15, 2007, PODC'07, ACM Press, 2007, pp. 13-22.*

* cited by examiner

*Primary Examiner* — Hanh Thai
(74) *Attorney, Agent, or Firm* — Park, Vaughan, Fleming & Dowler, LLP

(57) ABSTRACT

A reader-writer lock is provided that scales to accommodate multiple readers without contention. The lock comprises a hierarchical C-SNZI (Conditioned Scalable Non-Zero Indicator) structure that scales with the number readers seeking simultaneous acquisition of the lock. All readers that have joined the C-SNZI structure share concurrent acquisition, and additional readers may continue to join until the structure is disabled. The lock may be disabled by a writer, at which time subsequent readers will wait (e.g., in a wait queue) until the lock is again available. The C-SNZI structure may be implemented in a lockword or in reader entries within a wait queue. If implemented in reader entries of a wait queue, the lockword may be omitted, and new readers arriving at the queue may be able join an existing reader entry even if the reader entry is not at the tail of the queue.

18 Claims, 15 Drawing Sheets

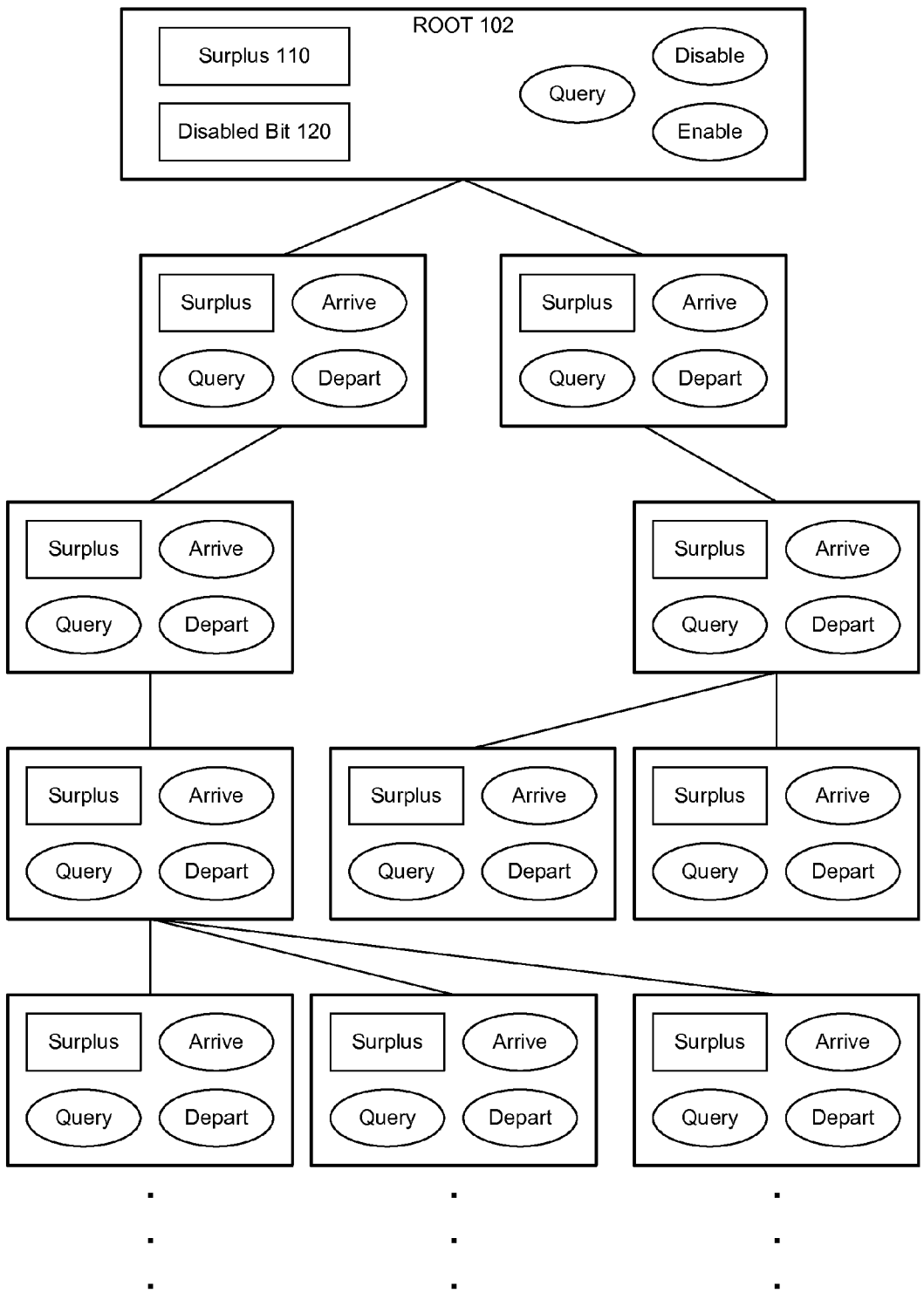
FIG. 1   C-SNZI Hierarchy 100

```
type SnziNode = record
   cnt    : int                  // initially 0
   parent : *SnziNode            // immutable pointer to parent Arrive(S: *SnziNode)
   var arrivedAtParent: boolean := false
   var x: int
   repeat
      x := S->cnt
      if x == 0 and !arrivedAtParent then
         if S->parent->Arrive() then
            arrivedAtParent := true
         else
            return false
   until CAS(&S->cnt, x, x+1)
   if arrivedatParent and x != 0
      S->parent->Depart()
   return true Depart(S: *SnziNode)
   repeat
      x := S->cnt
   until CAS(&S->cnt, x, x-1)
   if x == 1 then
      S->parent->Depart()
```

Non-Root Node 200

FIG. 2A

```
type SnziRootNode = record    //single CAS-able word
   cnt       : int             //initially 0
   enabled : boolean           // initially true Arrive(S: *SnziRootNode)
   repeat
      old := *S
      if !old.enabled then return false
   until CAS(S, old, (old.cnt+1, true))
   return true Depart(S: *SnziRootNode)
   repeat
      old := *S           // assert old.cnt > 0 and old.enabled = true
   until CAS(S, old, (old.cnt-1, true))

Query(S: *SnziRootNode)
   return (S->cnt != 0)

Disable(S: *SnziRootNode)
   return CAS(S, (0,true), (0,false))

Enable(S: *SnziRootNode)
   CAS(S, (0,false), (0,true))
```

Root Node 210

FIG. 2B

```
type RWlock = record
    root      : *SnziRootNode
    leafs[]   : SnziNode
    queue     : WaitQueue
    metalock  : Mutex type SnziNode = record
    cnt     : int              // initially 0
    parent  : *SnziNode        // immutable pointer to parent type SnziRootNode = record     // CASable record
    snziCount   : int
    ssCount     : int
    hasWaiters  : bool
    writeWanted : bool
    writeLocked : bool type Waiters = record
    type        : {READERS, WRITER}
    numWaiters  : int
    cv          : ConditionVariable type Local = record
    arrivedAtSS : bool procedure writerLock(L : *RWlock, l : *Local)
    while true
        var root: SnziRootNode
        root := *L->root
        if root == (0, 0, false, false, false)
            if (CAS(L->root, root, (0, 0, false, false, true)))
                return lock(L->metalock)
        root := *L->root
        if !root.writeWanted
            repeat
                root := *L->root
                if root == (0, 0, false, false, false)
                    break
            until CAS(L->root, root, (root.snziCount, root.ssCount,
                    true, true, root.writeLocked))

if root == (0, 0, false, false, false)
            unlock(L->metalock)
            continue var waiter: Waiters
        waiter := enqueueWriter(L->queue)
        unlock(L->metalock)
        Wait(waiter.cv)
        return
```

General Reader-Writer Lock 300

```
procedure writerUnlock(L : *RWlock, l : *Local)
   var root: SnziRootNode
   root := *L->root
   if !root.hasWaiters
      if CAS(L->root, root, (0, 0, false, false, false))
         return lock(L->metalock)

var new: SnziRootNode
   var waiters: Waiters
   waiters := dequeue(L->queue)

if waiters.type == READERS
      new := (0, waiters.numWaiters, HasWriters(L->queue) or
              HasReaders(L->queue), HasWriters(L->queue), false)
   else
      new := (0, 0, HasWriters(L->queue) or HasReaders(L->queue),
              HasWriters(L->queue), true)

*L->root := new unlock(L->metalock)

Signal(waiters.cv)
```

General
Reader-Writer
Lock
300

```
procedure readerLock(L : *RWlock, l : *Local)
   var root: SnziRootNode
   root := *L->root
   while true
      if !root.writeWanted and !root.writeLocked
         if snziArrive(L->leafs[getMyLeaf()])
            l->arrivedAtSS := false
            return lock(L->metalock)

root := *L->root
      if !root.hasWaiters
         repeat
            root := *L->root
            if !root.writeWanted and !root.writeLocked
               break
         until CAS(L->root, root, (root.snziCount, root.ssCount,
                  true, root.writeWanted, root.writeLocked))

if !root.writeWanted and !root.writeLocked
         unlock(L->metalock)
         continue var waiter: Waiters
      waiter := enqueueReader(L->queue)

unlock(L->metalock)

l->arrivedAtSS := true
      Wait(waiter.cv)
      return
```

General
Reader-Writer
Lock
300

```
procedure readerUnlock(L : *RWlock, l : *Local)
   var root: SnziRootNode
   var lastReaderWithWaiters: bool := false if l->arrivedAtSS
      repeat
         root := *L->root
         if root.writeWanted and root.snziCount == 0 and root.ssCount == 1
            lastReaderWithWaiters := true
            break
      until CAS(L->root, root, (root.snziCount, root.ssCounter - 1,
                                root.hasWaiters, root.writeWanted,
                                root.writeLocked))
   else
      lastReaderWithWaiters := !snziDepart(L->leafs[getMyLeaf()])

if !lastReaderWithWaiters
      return lock(L->metalock)

var new: SnziRootNode
   var waiters: Waiters
   waiters := dequeue(L->queue)

if waiters.type == READERS
      new := (0, waiters.numWaiters, HasWriters(L->queue) or
              HasReaders(L->queue), HasWriters(L->queue), false)
   else
      new := (0, 0, HasWriters(L->queue) or HasReaders(L->queue),
              HasWriters(L->queue), true)

*L->root := new unlock(L->metalock)
   Signal(waiters.cv)
```

General Reader-Writer Lock 300

```
procedure snziArriveRoot(S : *SnziRootNode)
   var old: SnziRootNode
   repeat
      old := *S
      if old.writeWanted or old.writeLocked
         return false
   until CAS(S, old, (old.snziCount + 1, old.ssCount,
                     old.hasWaiters old.writeWanted, false))
   return true procedure snziDepartRoot(S : *SnziRootNode)
   var old: SnziRootNode
   repeat
      var new: SnziRootNode
      old := *S
      if old.snziCount == 1 and old.ssCount == 0 and old.writeWanted
         return false
   until CAS(S, old, (old.snziCount - 1, old.ssCount,
                     old.hasWaiters, old.writeWanted,
                     old.writeLocked)
   return true procedure snziArrive(S : *SnziNode)
   var arrivedAtParent: boolean := false
   var x: int
   repeat
      x := S->cnt
      if x = 0 and !arrivedAtParent then
         if S->parent->Arrive() then
            arrivedAtParent := true
         else
            return false
   until CAS(&S->cnt, x, x+1)
   if arrivedAtParent and x != 0
      S->parent->Depart()
   return true procedure snziDepart(S : *SnziNode)
   repeat
      x := S->cnt
   until CAS(&S->cnt, x, x-1)
   if x == 1 then
      return S->parent->Depart()
   return true
```

General Reader-Writer Lock 300

FIG. 3E

```
type RWlock = record
    tail      : TailNode
    rNodes : *Node              // Some node in linked ring of all reader nodes type Node = record
    root       : *SnziRootNode
    leafs[]    : *SnziNode
    q_next     : *Node
    spin       : bool
    allocState : enum {Free, InUse}    // Initially all Free
    next       : *Node type SnziNode = record
    cnt     : int               // initially 0
    parent  : *SnziNode         // immutable pointer to parent type SnziRootNode = record      // CASable record
    snziCount    : int
    writeWanted  : bool
    writeLocked  : bool type Local = record
    rNode      : *Node          // Default node in reader node ring. Immutable.
    wNode      : *Node          // Write node.  Immutable.
    departFrom : *Node          // Record the node we last arrived at.

type TailNode = record          // CASable record
    ptr  : *Node
    type : enum {READER, WRITER})
```

FIFO Reader-Writer Lock 400

```
procedure allocReaderNode(l : *Local)
    var currNode: *Node currNode := l->rNode
    while true
        if currNode->allocState == Free
            if CAS(&currNode->allocState, Free, InUse)
                return currNode
        currNode = currNode->next procedure freeReaderNode(N : *Node)
    N->allocState := Free
```

```
procedure writerLock(L : *RWlock, l : *Local)
   var tail: TailNode l->wNode->spin := 1
   l->wNode->q_next := nil tail := fetch_and_store(&L->tail, (l->wNode, WRITER))

if tail.ptr != nil
      tail.ptr->q_next := l->wNode
      if tail.type == WRITER
         repeat until l->wNode->spin == 0
      else
         repeat until (!tail.ptr->root->writeLocked)    //predecessor recycled?
         var new: SnziRootNode
         while true
            var old: SnziRootNode
            old := *tail.ptr->root
            new := (old.snziCount, true, old.snziCount == 0)
            if CAS(tail.ptr->root, old, new)
               break if !new.writeLocked
            repeat until l->wNode->spin == 0
         else
            repeat until tail.ptr->spin == 0
            freeReaderNode(tail.ptr)

procedure writerUnlock(L : *RWlock, l : *Local)
   var tail: TailNode if l->wNode->q_next == nil and CAS(&L->tail, (l->wNode, WRITER), (nil,
                                      WRITER))
      return repeat until l->wNode->q_next != nil
   l->wNode->q_next->spin := 0
```

FIFO Reader-Writer Lock 400

```
procedure readerLock(L : *RWlock, l : *Local)
   var tail : TailNode
   var rNode : *Node
   rNode := nil while true
      tail := L->tail if tail.ptr == nil              // If no nodes are in the queue
         if rNode == nil
            rNode := allocReaderNode(l)
         rNode->spin := 0
         rNode->q_next := nil
         if CAS(&L->tail, tail, (rNode, READER))
            rNode->root = (0, false, false)
            if snziArrive(rNode.leafs[getMyLeaf()])
               l->departFrom := rNode
               return
         rNode = nil                  // Avoid reusing inserted entry else                            // Otherwise, there is an entry in the queue
         if tail.type == WRITER       // Is the last entry a writer entry?
            if rNode == nil
               rNode := allocReaderNode(l)
            rNode->spin := 1
            rNode->q_next := nil
            if CAS(&L->tail, tail, (rNode, READER))
               tail.ptr->q_next := rNode
               rNode->root := (0, false, false)
               if snziArrive(rNode.leafs[getMyLeaf()])
                  l->departFrom := rNode
                  repeat until rNode->spin == 0
                  return
            rNode := nil              // Avoid reusing inserted entry else              // tail.type == READER  (last entry is a reader)
            if snziArrive(tail.ptr->leafs[getMyLeaf()])
               if rNode != nil
                  freeReaderNode(rNode)
               l->departFrom := tail.ptr
               repeat until tail.ptr->spin == 0
               return procedure readerUnlock(L : *RWlock, l : *Local)
   var handToWriter: bool
   handToWriter := snziDepart(l->departFrom->leafs[getMyLeaf()])

if handToWriter
      repeat until l->departFrom->q_next != nil
      l->departFrom->q_next->spin := 0
      freeReaderNode(rNode)
```

FIFO
Reader-Writer
Lock
400

```
procedure snziArriveRoot(S : *SnziRootNode)
   var old: SnziRootNode
   do
      old := *S
      if old.writeLocked
         return false
   repeat until CAS(S, old, (old.snziCount + 1, old.writeWanted, 0))
   return true procedure snziDepartRoot(S : *SnziRootNode)
   var old: SnziRootNode
   do
      var new: SnziRootNode
      old := *S
      if old.snziCount == 1 and old.writeWanted == true
         new = (0, false, true)
      else
         new = (old.snziCount - 1, old.writeWanted, false)
   repeat until CAS(S, old, new)
   return new.writeLocked procedure snziArrive(S : *SnziNode)
   var arrivedAtParent: boolean := false
   var x: int
   repeat
      x := S->cnt
      if x == 0 and !arrivedAtParent then
         if S->parent->Arrive() then
            arrivedAtParent := true
         else
            return false
   until CAS(&S->cnt, x, x+1)
   if arrivedAtParent and x != 0
      S->parent->Depart()
   return true procedure snziDepart(S : *SnziNode)
   repeat
      x := S->cnt
   until CAS(&S->cnt, x, x-1)
   if x == 1 then
      return S->parent->Depart()
   return false
```

FIFO
Reader-Writer
Lock
400

FIG. 4D

SCALABLE READER-WRITER LOCK

RELATED APPLICATION

The present application is related to U.S. patent application Ser. No. 12/200,206, filed on 28 Aug. 2008 and entitled "Conditioned Scalable Non-Zero Indicator", which is hereby incorporated by reference.

BACKGROUND

This invention relates to the field of concurrently accessed data structures within computer systems. More particularly, a method and apparatus are provided for reducing contention for a reader-writer lock among concurrent readers.

Reader-writer locks are mechanisms frequently implemented in concurrent programming environments for synchronizing and arbitrating access to a shared resource, such as memory, data storage, an input or output device, and so on. The lock serves as a control point for access to the resource, and resource requesters (e.g., threads of execution, software processes) needing to access the resource must have control of the lock before they can proceed.

With a typical reader-writer lock, a single requester may write to the shared resource, or multiple requesters may simultaneously read from the resource. However, a typical reader-writer lock inherently includes at least one control structure for which multiple requesters must contend.

This point of contention may be a lockword that can only be controlled by one writer or one or more readers at a time. This lockword is the gateway to the resource—only a requester that has control of (has "locked") the lockword can access the resource. Because all requesters are simultaneously and continually attempting to gain control of the lockword, a lot of processing cycles may be lost to contention.

To mitigate contention on the lockword, many reader-writer schemes have implemented a queue to allow requesters to be sequenced in some orderly fashion. However, these schemes usually merely shift the point of contention, even if the queue is configured to replace the lockword altogether.

When a queue is implemented to order requesters seeking access to a lockword, a mutex (mutual exclusion) lock is sometimes implemented with the queue to allow only one requester at a time to modify the queue—whether to add itself to the queue, rearrange the queue, etc.

Even if a mutex lock is not used to control access to the queue, and even if the queue completely replaces the lockword (in which case the resource requester at the head of the queue is granted access to the resource), contention will still be found. For example, if each requester must add itself to the tail of the queue (e.g., to implement a FIFO scheme), the tail pointer of the queue becomes a single point of contention for which all new requesters vie.

One type of reader-writer lock that comprises a queue allows multiple successive readers in the queue to enter their critical sections (i.e., access the resource) simultaneously. As described immediately above, the tail pointer of the queue still acts as a point of contention for all requesters. In addition, if a later reader in the sequence of readers finishes before its predecessor, it must behave appropriately—by determining whether to splice itself out of the queue, notify the preceding or succeeding node of its departure, etc.

In this particular scheme, each reader node implements its own mutex lock. This allows a following node to modify its predecessor, so as to splice the following node out of the queue, for example. However, depending on when the predecessor node finishes (e.g., before the following node can grab the predecessor's lock), there may be contention for the predecessor's lock. Thus, this scheme not only suffers from contention on a tail pointer for the queue, but also from possible contention for locks on individual queue entries.

In addition, queue-based locks that maintain the order of waiting requesters without a mutex lock are often difficult to extend when additional features or more sophisticated fairness guarantees are required. For example, the reader-writer lock implementation used in the Solaris kernel employs a complicated algorithm that attempts to group readers together while considering the priorities of waiting writers and the possibility of priority inversion.

The Solaris lock forgoes a distributed queue-based design in favor of a central one: a single lockword is used to ensure reader-writer exclusion during access to a target resource, and a mutex-protected queuing data structure orders threads when the lockword is contended. The lockword contains a count of active readers, and a new reader can acquire the Solaris lock by incrementing the active reader count, but only if the lock is not write-locked and does not have writers waiting to acquire it. Thus, the lockword is a source of contention even under read-only workloads.

When the Solaris lock becomes contended (that is, when a writer wants to acquire the lock when it is held by another entity, or when a reader wants to acquire the lock when it is held by a writer), threads acquire the central mutex and add themselves to the queue data structure. The last active reader (or any writer) that releases the reader-writer lock must acquire the mutex and pass on ownership of the lock whenever the appropriate bit in the lockword indicates that a thread is waiting on the lock.

Thus, the mutex quickly becomes contended when writers are added to the workload. Because of these sources of contention, it is not surprising that the lock can be a performance bottleneck. In fact, it is possible for the lock to cause the kernel to panic due to thread timeouts.

In summary, existing reader-writer locks do not scale well under heavy loads, even heavy loads of requesters seeking read-only access. Contention over access to a single structure degrades the requesters' performance, whether that structure is a lockword, a tail pointer of a queue, a counter of the number of active readers, a mutex lock or something else. The smaller the critical section of a requester (i.e., the program code to be executed while the requester has access to the resource) and the greater the frequency with which it is executed, the greater the impact of the contention.

SUMMARY

In some embodiments of the invention, a system and methods are provided for implementing a scalable reader-writer lock for a shared resource, to allow simultaneous read access without requiring the readers to contend on a single location (e.g., a counter, a tail pointer of a queue). The lack of contention allows the lock to function efficiently even under heavy access by concurrent readers.

In these embodiments, the lock comprises a hierarchical C-SNZI (Conditioned Scalable Non-Zero Indicator) structure that scales with the number of readers (e.g., by adding non-root nodes). All readers that have joined the C-SNZI structure share concurrent acquisition of the lock, and additional readers may continue to join unless and until the structure is disabled.

The C-SNZI structure may be disabled by a writer, such as by setting a writeWanted bit, at which time subsequent readers must wait (e.g., in a wait queue) until the lock is again available.

In different embodiments, the C-SNZI structure may be implemented in a lockword or in reader entries within a wait queue. If implemented in reader entries of a wait queue, the lockword may be omitted, and new readers arriving at the queue may be able join an existing reader entry even if the reader entry is not at the tail of the queue.

DESCRIPTION OF THE FIGURES

FIG. 1 is a block diagram depicting a C-SNZI (Conditioned Scalable NonZero Indicator) data structure in accordance with some embodiments of the present invention.

FIGS. 2A-2B present pseudocode for non-root nodes and a root node in a C-SNZI data structure, in accordance with some embodiments of the invention.

FIGS. 3A-3E present pseudocode for a general reader-writer lock, in accordance with some embodiments of the present invention.

FIGS. 4A-4D present pseudocode for a FIFO reader-writer lock, in accordance with some embodiments of the present invention.

DETAILED DESCRIPTION

Figure 5:
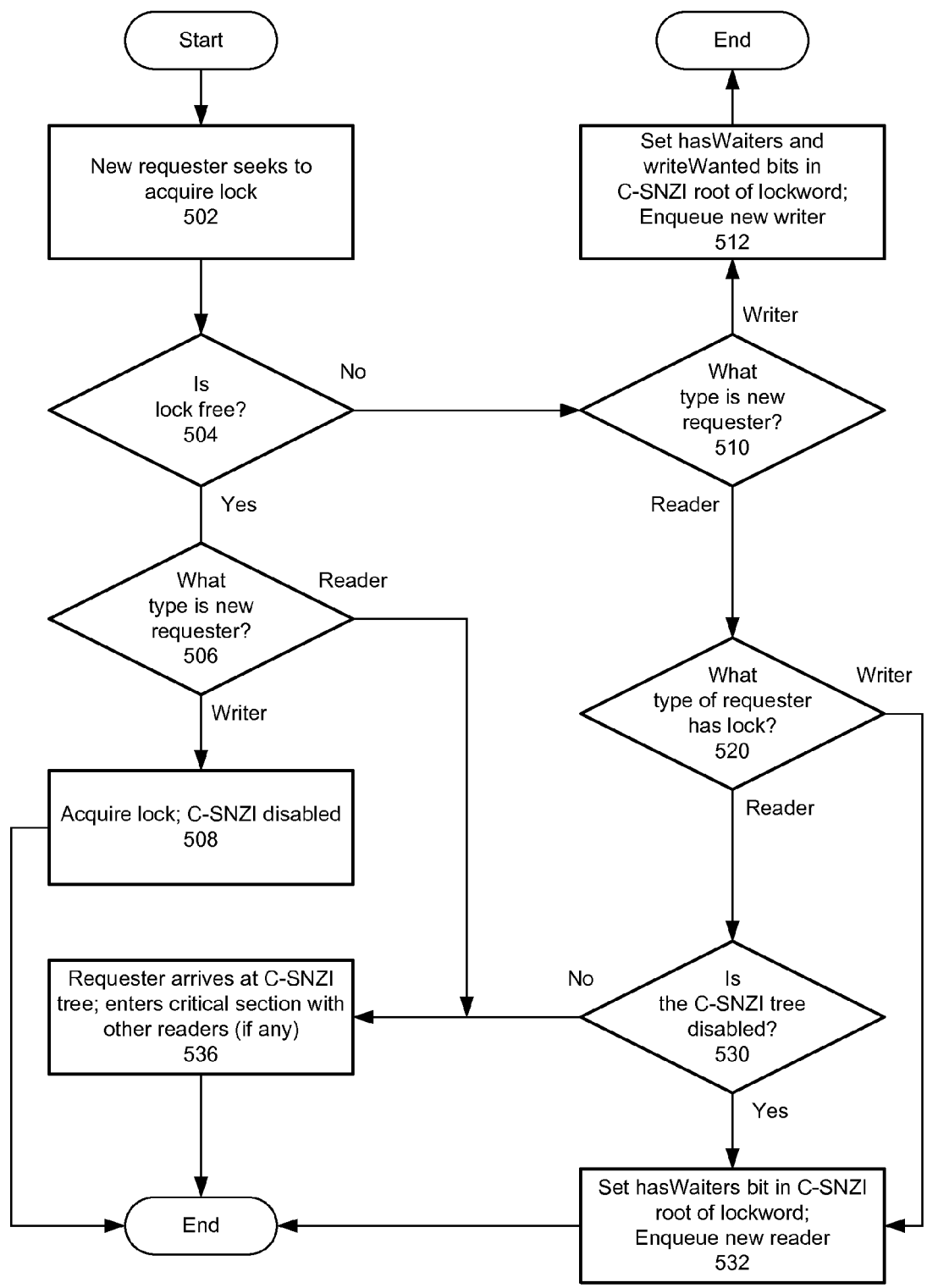
FIG. 5 is a flowchart demonstrating partial functioning of a general reader-writer lock, according to an embodiment of the invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In embodiments of the invention described herein, scalable reader-writer locks and methods of implementing the locks are provided. The reader-writer locks are well-suited to operating environments characterized by heavy read-only access to a shared resource (e.g., memory, input/output).

Different embodiments of the invention feature reader-writer locks with different features. A common characteristic of the locks, however, is the use of a Conditioned Scalable Non-Zero Indicator (C-SNZI) to facilitate a determination as to whether any requesters are currently reading from the resource.

This differs significantly from previous reader-writer locks in which an exact count of active readers must be continually updated. Because no central counter or variable must be maintained, there is no contention for such a counter among multiple concurrent readers. In addition, the locks scale well as the number of readers increases.

A C-SNZI data structure described in U.S. patent application Ser. No. 12/200,206 (the '206 application), filed Aug. 28, 2008 and entitled "Conditioned Scalable Non-Zero Indicator" is suitable for use with embodiments of the invention described herein. The '206 application is incorporated herein by reference.

A C-SNZI hierarchy is an abstract data structure that can scale to accommodate heavy demand for its services. It is a type of nonzero indicator (NZI), which is an object that provides Arrive, Depart and Query operations. The difference between the number of Arrive operations and the number of Depart operations at an NZI is called the surplus of the structure, and the Query operation identifies whether the surplus is zero (which would indicate that the number of Arrive operations is equal to the number of Depart operations).

With an NZI, users must not invoke Depart when the surplus is zero (i.e., they must not invoke Depart more often than Arrive), and so the surplus is never negative. An NZI object could be implemented easily with a counter that is incremented by Arrive and decremented by Depart. However, such an implementation introduces unnecessary contention among the operations. In particular, a Query operation would conflict with every Arrive and Depart operation.

A Scalable nonzero indicator (SNZI) avoids this contention by avoiding the frequent modifications that would otherwise be made to a shared memory location when the surplus changes from one nonzero value to another. Instead, by simply capturing changes in the surplus from zero to nonzero and vice versa, the Query operation will return the necessary information (i.e., whether the surplus is zero) even while minimizing modifications to the shared memory location.

A C-SNZI hierarchy as implemented in some embodiments of the invention is a variant of the SNZI that can "disable" the data structure when its surplus is zero. Specifically, a C-SNZI data structure permits two additional operations on its root node: Disable and Enable. The Disable operation disables the C-SNZI structure and returns true if the surplus is zero and the structure is not already disabled; otherwise, it leaves the data structure unchanged and returns false. The Enable operation re-enables the structure.

Arrive operations on an enabled C-SNZI hierarchy work as usual, increasing the surplus by one, and returning true. Arrive operations on a disabled C-SNZI hierarchy do not change the surplus and return false. Depart operations decrease the surplus by one and return true if the C-SNZI structure is enabled.

As with the typical NZI, users must not invoke Depart when the surplus is zero. In other words, they must not invoke Depart more often than Arrive returns true. This also implies that they do not invoke Depart when the C-SNZI structure is disabled.

In some embodiments of the invention, the C-SNZI data structure comprises a hierarchy of SNZI nodes, wherein each node can have any number of children. The hierarchy therefore may be of virtually any height, width and dimension.

When a reader (a thread, process or other entity seeking read access) attempts to join the C-SNZI structure so as to access the shared resource with other readers, it initiates an Arrive operation at any node within the hierarchy. Selection of a node at which to Arrive may be random or may be determined via any suitable algorithm. When it finishes executing its critical section and no longer needs the resource, a Depart operation is performed. The Depart should be performed at the same node at which the Arrive operation was performed.

A property of the C-SNZI structure dictates that the root of the structure has a surplus if and only if some node in the tree has a surplus. Thus, a measure of the surplus (if any) at the root node indicates whether more readers have arrived at the C-SNZI data structure than have departed.

To support this property, the existence of a surplus at a given node percolates upward to the root of the hierarchy. Specifically, the surplus at a given node is nonzero if the difference between Arrive and Depart operations invoked directly at that node plus the aggregate surplus of all of its children is nonzero. It may be noted that once the surplus at a given node is incremented from an initial value of zero, and that surplus is communicated upward through the hierarchy, subsequent arrivals need not be propagated upward. The root node merely needs to indicate whether or not the surplus is zero, and does not need to provide an actual nonzero value.

In other words, a given node of a C-SNZI hierarchy may signal to its ancestor only the first arrival of a reader and, later, the departure of its last reader (i.e., a node reports to its parent only arrivals and departures that change the node's surplus from zero to nonzero or vice versa). This is sufficient to communicate upward that the given node has a surplus, and to erase that surplus when appropriate.

In some embodiments of the invention, a C-SNZI data structure may be implemented within, or in place of, a lockword that requesters must control or join before they can access the shared resource. In other embodiments of the invention, a C-SNZI object may be implemented within a queue that orders requesters awaiting access to the resource.

FIG. 1 depicts a C-SNZI hierarchical data structure that may be employed in an embodiment of the invention. In hierarchy 100, root node 102 maintains a surplus that reflects whether a surplus exists across the span of the hierarchy. The status of surplus 110 can be ascertained by invoking the root node's Query operation. Each node in the hierarchy also maintains a surplus and offers the Query operation, as well as Arrive and Depart operations for readers joining the structure.

In the illustrated C-SNZI structure, disabled bit 120 is utilized to signal whether the structure has been disabled. For example, the Disable operation can atomically set the disabled bit only if the surplus of the C-SNZI structure is zero. The disabled bit may be cleared via the Enable operation.

In other embodiments of the invention, the root node of a C-SNZI structure may comprise additional features, such as a "write wanted" or "drain" bit that a writer may set to indicate that it is waiting for the readers associated with the C-SNZI hierarchy to finish so that it may access the resource.

FIGS. 2A-2B are illustrative sets of pseudocode for implementing a non-root node of a C-SNZI data structure (FIG. 2A) and a root node (FIG. 2B). Pseudocode for non-root node 200 implements Arrive and Depart operations to allow requesters to join and depart a node of the structure. Pseudocode for root node 210 includes these operations, as well as Query, Disable and Enable operations. Non-root (e.g., leaf) nodes may also offer Query operations but, in some embodiments of the invention, performing a Query operation at the root is more relevant to operation of a reader-writer lock than performing a Query at a non-root node.

General Reader-Writer Lock

In some embodiments of the invention, a general reader-writer lock is provided to arbitrate access to a resource. Similar to the Solaris reader-writer lock, a general reader-writer lock described herein comprises a lockword and a queue, and the lock can be easily modified to provide different fairness guarantees.

The lockword comprises a C-SNZI object to track readers and writers in a scalable manner in the uncontended case (i.e., when no requesters are waiting to access the resource). A mutex protects a central queue used to order waiting threads in the contended case (i.e., when requesters are waiting for the resource).

Because multiple readers can acquire the reader-writer lock just by operating on the C-SNZI structure, the queue's mutex need not be accessed for read-only workloads (i.e., no intervening writers seek acquisition of the lock), thereby allowing the lock to scale well. In the contended case, the use of a mutex to protect the wait queue provides a large degree of flexibility, allowing developers to easily implement advanced fairness features such as priority-based queuing and priority inheritance.

In some embodiments of the invention, a requester that needs to modify the lockword (e.g., to indicate that a writer needs to access the lock) will first acquire the mutex for the wait queue. Doing so ensures that operations on the queue will appear atomic with modifications to the lockword. Other threads will not be able to access the queue until after the modifying requester releases the mutex.

FIGS. 3A-3E illustrate exemplary pseudocode for a general reader-writer lock according to some embodiments of the invention. The lock enforces reader-writer exclusivity via a C-SNZI tree having a CASable root node (i.e., a compare-and-swap operation may be performed on the root node).

The root node comprises two counters (snziCount and ssCount) and three status bits (hasWaiters, writeWanted and writeLocked), in addition to the components of root node 102 of FIG. 1. TABLE 1 summarizes the functions of these counters and bits. In some embodiments of the invention, however, ssCount is not implemented within the C-SNZI structure, but rather is external and therefore can be modified without accessing the C-SNZI structure.

TABLE 1

| Counter/Bit | Description |
| --- | --- |
| snziCount | Tracks the number of readers that have Arrived at the C-SNZI hierarchy but have not yet Departed |
| ssCount | Tracks the number of readers that have joined the C-SNZI hierarchy without invoking an Arrive operation |
| hasWaiters | When set, indicates that one or more requesters are queued and waiting for the lockword |
| writeWanted | When set, indicates that a writer is queued and waiting for the lockword |
| writeLocked | When set, indicates that a writer has control of the lockword |

In the presently described embodiment of the invention, the C-SNZI structure is considered disabled whenever the writeLocked or the writeWanted bit is set. When disabled, no additional readers can Arrive at the structure.

Both snziCount and ssCount are used to track active readers; the lock is acquired for reading if and only if either counter is nonzero. A reader can therefore acquire the lock either by incrementing ssCount or by arriving at the C-SNZI tree. Invoking the Arrive operation (e.g., at a non-root node of the tree) automatically updates snziCount as necessary to ensure that any surplus existing in any node of the hierarchy is communicated up to the root.

The ssCount counter serves a number of functions. First, it allows a fast acquisition of the lock for reading when there is no high contention caused by readers. In particular, in the absence of contention it may be faster for a new reader to simply increment ssCount and enter its critical section, rather than to select a node of the C-SNZI hierarchy and invoke the Arrive operation.

Second, and as described below, use of the ssCount counter allows a fast hand-over of the lock between writers and readers. And finally, it enables the write upgrade feature, whereby a reader can be upgraded to a writer, also as described below.

In some embodiments of the invention, computation of a surplus (or a determination of whether a surplus is greater than zero) may involve not only determining a difference between Arrive operations and Depart operations, but also adding or examining the value (if any) of the ssCount counter.

Note that a reader is generally expected to leave the C-SNZI in the same manner in which it joined—by either invoking Depart (if it joined by invoking Arrive) or by decrementing ssCount (if it joined by incrementing ssCount).

In some embodiments of the invention, a reader desiring to acquire the lock and enter its critical section first attempts to simply increment ssCount; snziCount may be required to be zero in order to attempt to increment ssCount. Success allows the reader to commence its work. Failure indicates contention, and so the reader backs off and invokes Arrive at a non-root node of the tree.

As shown in the writerLock procedure in FIG. 3A, the lock is acquired for writing by setting the writeLocked bit. Thus, a writer acquires an uncontended general reader-writer lock by CASing the root node of the C-SNZI structure and setting the writeLocked bit.

In the case of contention, a writer acquires the lock by CASing the root node (only after the mutex protecting the queue is held), setting the writeWanted and hasWaiters bits in the root node, and inserting itself into the queue. This operation is guaranteed to appear atomic.

A writer can enqueue itself upon the wait queue by calling enqueueWriter( ), a function that inserts writers into the queue according to any fairness policy desired. This function returns a Waiters object, which contains a condition variable that the writer can wait on.

The writer will own the lock when it is done waiting on the condition variable (e.g., when it is alerted that the previous entry in the queue has finished its work). In some embodiments of the invention, a writer can busy-wait on a regular variable instead of using a condition variable.

Procedure writerUnlock of FIG. 3B shows that when a writer is ready to release a lock, if the lock is uncontended it simply resets the writeLocked bit. Otherwise, if other threads are waiting on the lock (e.g., hasWaiters is set), it acquires the queue mutex and dequeues a writer or group of readers, whichever is next in line.

To release the lock, the writer updates the root node to hand over the lock and signals the waiting requester(s) (one writer or a set of readers). When handing the lock to readers, the writer acquires the lock on behalf of the readers by setting ssCount to the number of readers, rather than manipulating the snziCount and the C-SNZI hierarchy.

According to procedure readerLock of FIG. 3C, when a reader wants to acquire a lock, it first checks whether the writeWanted or writeLocked bits are set in the root node of the C-SNZI structure, which indicate if a writer requester has the lock or is already waiting to acquire the lock for writing. If neither bit is set, the reader performs an Arrive on some node of the C-SNZI hierarchy. The lock is successfully acquired if the C-SNZI Arrive succeeds.

If the Arrive fails, the C-SNZI tree must have been disabled after the root node was checked, which indicates writer contention. In this case, the reader acquires the mutex, atomically inserts itself into the queue and sets the hasWaiters bit in the root node of the C-SNZI hierarchy.

Similar to the enqueueWriter( ) function, the enqueueReader( ) function enqueues the reader into the queue data structure and returns a Waiters object. At this point, the thread knows that it will receive ownership of the lock from a thread that acquires it using the ssCount.

More specifically, whenever a writer releases the lock and readers are next in line in the queue, the writer will "transfer" the lock to them by adding the number of consecutive readers to ssCount (ssCount must be zero while a writer owns the lock). For example, if there are three readers immediately after the writer, it sets ssCount to three when it releases the lock. Normally, a writer will not invoke Arrive operations on behalf of waiting readers.

Thus, a reader that acquires the lock after waiting in the queue always knows that ssCount was incremented on its behalf. This information is saved in a thread-local variable I, which each thread maintains so that it knows, when releasing the lock, whether to do so by departing from the C-SNZI tree or by decrementing ssCount.

As reflected in procedure readerUnlock of FIG. 3D, when a reader is ready to release the lock, if the lock is uncontended the reader either decrements the ssCount or departs from the C-SNZI hierarchy, depending on how it acquired the lock (a successful Depart operation automatically decrements snziCount). However, if there is a requester waiting on the lock (e.g., hasWaiters is set), the last active reader to release the lock must hand over the lock to the waiting requester.

If the last reader acquired the lock using the ssCount, the hand-over is performed in a manner similar to writerUnlock. If the last reader acquired the lock through the C-SNZI tree (i.e., by performing Arrive at a node of the tree), the Depart operation is altered to allow an atomic transfer of the lock to the waiting requester.

More specifically, and as shown in FIG. 3E, when a last reader is trying to release the lock via snziDepartRoot, and the writeWanted bit is set, snziCount is not decremented to zero. Instead, the snziDepartRoot function returns false and leaves the root node unchanged.

This result is passed down through the various snziDeparts on the nodes on the path to the root, and ultimately returned to the readerUnlock function that called snziDepart on a leaf. The readerUnlock function then does the hand-off to the waiting writer by acquiring the mutex protecting the queue and installing the next waiter.

Delaying the write in this way violates the property of the C-SNZI structure that requires the presence of a surplus at any node to be propagated to the root. However, because this step only occurs if the C-SNZI tree is disabled (e.g., writeWanted is set), it is safe to do so because no new readers can modify the tree when it is disabled. For the same reason, it is safe to modify the root node using a regular write operation (rather than a CAS) when handing over the lock to a writer.

In some embodiments of the invention, a general reader-writer lock can support an upgrade feature that allows an active reader to promote itself to write status if it is the only reader holding the lock. Illustratively, write upgrading may be performed by (1) incrementing ssCount, (2) departing from the C-SNZI data structure, and (3) atomically setting the writeLocked bit if and only if ssCount is 1 and snziCount is 0.

Via this process, a requester "trades" its presence in the C-SNZI structure with a presence in the ssCount counter. Afterward, the surplus of the C-SNZI tree is 0 and the value of the ssCount is 1. Therefore, it is guaranteed that there is exactly one reader holding the lock, and it thus can be upgraded.

As alluded to above, use of a C-SNZI structure in a general reader-writer lock obviates the need to maintain a central counter variable that tracks the specific number of readers currently sharing control of the lockword, and therefore eliminates the contention inherent in maintaining such a variable.

FIG. 5 is a flowchart demonstrating partial functioning of a general reader-writer lock, according to an embodiment of the invention. The illustrated operations demonstrate the concurrent acquisition of a lockword by multiple readers via a hierarchical C-SNZI data structure. Other operations may be derived from the preceding description.

In operation 502, a new requester seeks to acquire the lock in order to access a resource controlled by the lock. The requester may be seeking read or write access.

In operation 504, the new requester determines whether the lockword is free. If the lockword is free, the illustrated method continues at operation 506; if the lockword is not free, the method advances to operation 510.

In operation 506, if the requester is a writer, the method continues at operation 508; if the requester is a reader, the method advances to operation 536 where the reader acquires the lockword and allows other readers to share it.

In operation 508, the lock is free (uncontended) and therefore the writer requester may immediately acquire it, which automatically causes the C-SNZI structure of the lockword to be disabled. The illustrated method of the invention then ends, or may return to operation 502 to handle the arrival of another requester.

In operation 510, the lock has already been acquired, and the new requester's type determines how to proceed. If the requester is a writer, the method continues at operation 512; if the requester is a reader, the method advances to operation 520.

In operation 512, the new writer requester sets the hasWaiters and writeWanted bits in the root node of the C-SNZI structure within the lockword, and enqueues itself. This ensures that no more readers join that structure (if the lockword is currently held by one or more readers), and that the holder of the lockword knows there is a requester waiting in the queue. If the attempt to enqueue itself fails, the requester may try again or the method may return to operation 504.

After operation 512, the illustrated method of the embodiment ends, or may return to operation 502 to handle the arrival of another requester.

In operation 520, the new requester is a reader and may be able to immediately acquire the lock if it is currently held by one or more other readers. Therefore, the type of requester currently holding the lockword is determined. If the holder is a writer, the method advances to operation 532; if the holder is a reader, the method continues at operation 530.

In operation 530, the lock is held by one or more readers and the new requester is a reader, and so it determines whether the C-SNZI structure of the lockword is disabled (e.g., whether the writeWanted bit or writeLocked bit is set), in which case the new reader cannot join the C-SNZI structure. If it is disabled, the new reader proceeds to operation 532; otherwise, the method advances to operation 536.

In operation 532, the new reader requester sets the hasWaiters bit in the root node of the C-SNZI structure of the lockword, then enqueues itself. If the attempt to enqueue itself fails, the requester may try again or the method may return to operation 504.

In operation 536 the new reader performs an Arrive operation at a node in the hierarchy and can enter its critical section with other reader(s) that arrived previously and have not departed. In some circumstances, as described previously, a reader may join the C-SNZI hierarchy by incrementing ssCount instead of performing an Arrive operation.

Note that if the reader's attempt to perform an Arrive operation at the C-SNZI tree fails (e.g., because of sudden contention with another requester), the reader may simply back off and retry, or the method may return to operation 504.

FIFO Reader-Writer Lock

In other embodiments of the invention, a FIFO (First In First Out) reader-writer lock is provided. The FIFO lock omits a lockword, but comprises a distributed queue that ensures a measure of fairness by enforcing FIFO access to the resource. Because this type of lock functions without a lockword, access to the resource is granted to the requester(s) associated with the entry at the head of the queue.

A characteristic feature of the FIFO reader-writer lock is that reader entries in the distributed queue comprise C-SNZI tree structures, thereby allowing multiple readers to be assigned to one entry and acquire the lock at the same time. This permits read-only workloads to avoid writing to the tail pointer entirely, and thus eliminates a major source of contention in the lock.

When a reader needs to join the queue, if the tail entry in the queue is associated with a reader, it simply joins that entry. In this case it only needs to read the tail pointer instead of writing to it. If the tail entry is associated with a writer, then the reader will create a new reader entry. A new writer will, of course, create a new writer entry in the queue.

Unlike other distributed queue-based reader/writer locks, in the presently described embodiment of the invention, reader entries are never enqueued adjacent to one another. Therefore, complicated synchronization mechanisms for allowing neighboring reader nodes to be concurrently removed from the queue (e.g., per-entry locks) are unnecessary.

FIGS. 4A-4D present illustrative pseudocode for a FIFO reader-writer lock according to some embodiments of the invention. Within the wait queue (the queue of requesters awaiting access to the resource), each entry contains a q_next pointer that points to the next entry in the wait queue, and a spin variable on which the entry's requester(s) can busy-wait.

Additionally, reader entries contain a C-SNZI root node that roots a C-SNZI tree, and any number of SNZI nodes, through which readers Arrive and Depart. Finally, reader entries contain an allocState variable and a next pointer used to manage recycling of the queue entries.

A C-SNZI root node in a FIFO reader-writer lock comprises a snziCount counter, a writeWanted bit and a writeLocked bit. The C-SNZI tree is disabled when the writeLocked bit is set. Note that unlike in the general reader-writer lock, the C-SNZI structure is not disabled when the writeWanted bit is set.

The illustrated pseudocode does not include an ssCount counter, which would allow threads to arrive more quickly in the absence of contention. As described above, when the ssCount counter is implemented, a reader can simply increment the counter and enter its critical section instead of performing an Arrive operation on a leaf node of a C-SNZI tree. The ssCount counter may be implemented, however, in other embodiments of the invention. The hasWaiters flag is also omitted in the presently described embodiments of the invention, but is implemented in other embodiments.

Because threads acquiring the lock act differently depending on whether the tail entry of the queue is associated with a reader or a writer, the type of entry at the tail of the queue is encoded in the low-order bit of the tail pointer. In some embodiments of the invention, the type of an entry may be stored in the entry itself instead of being encoded in the low-order bit of the tail pointer.

In some implementations, a reader entry may or may not be dequeued from the queue when the last reader associated with the entry Departs (and releases the lock) and no other entries are queued. For example, a reader entry may be left in place, instead of being dequeued, so that future readers can acquire the lock without contending on the tail pointer. Thus, a reader entry can be in an unused state while on the queue, and a writer that subsequently joins the queue must explicitly determine whether the previous entry is in use.

A writer seeking to acquire the lock may proceed as indicated in the writerLock procedure of FIG. 4B. First, the writer atomically reads and changes the tail to point to its new writer entry, and then updates the q_next field of the previous tail entry to complete the enqueuing operation. Then, if the new writer's predecessor is a writer, the new entry simply busy-waits on its spin variable as usual.

If the predecessor entry is a reader, the writer must first ensure that the predecessor is properly recycled (and wait until this is accomplished, if necessary), as discussed in more detail below. The writer then examines the snziCount field in the predecessor's C-SNZI root node. If the counter is non-zero, the writer atomically sets the writeWanted bit and then begins busy-waiting on its spin variable.

Otherwise, if snziCount is zero, the reader entry is unused. In this case, the thread disables the C-SNZI tree of that reader entry by setting its writeLocked bit, then busy-waits by spinning on the spin variable of its predecessor. While disabled, any reader threads attempting to acquire the lock through that entry will fail. Finally, when the writer is done waiting on the spin variable, it frees the reader entry to be reused by calling freeReaderNode.

In the writer unlock operation (procedure writerUnlock of FIG. 4B), the requester atomically notifies a successor thread by resetting that successor's spin flag. If no threads are waiting for the lock, there is no successor thread with a spin flag to be reset. The writer can easily detect this situation because its entry will be at the tail of the queue. In this case, the writer first tries to remove itself from the queue by changing the tail pointer from pointing to its write entry to pointing to nil. If this fails, it then proceeds to notify its successor by setting its spin flag.

A reader attempting to acquire the lock will perform one of three steps depending on the state of the lock, as shown in the readerLock procedure of FIG. 4C.

If the tail pointer is nil, the thread enqueues a new entry by allocating a new reader entry and CASing its pointer into the tail variable (with type READER encoded into the pointer). Subsequently, the reader performs an Arrive operation on the new entry's SNZI tree. If the Arrive succeeds, the thread has successfully acquired the lock (because there are no other entries in the queue ahead of the newly added reader entry).

If the tail pointer points to a reader entry when a new reader attempts to acquire the lock, the new reader simply performs an Arrive on the tail entry's C-SNZI tree. If the Arrive succeeds, the thread busy-waits on the spin variable.

If the tail pointer points to a writer entry when a new reader attempts to acquire the lock, the reader enqueues a newly allocated reader entry onto the queue and attempts to arrive at the entry's C-SNZI tree. If/when the Arrive succeeds, the lock is not yet acquired because the entry is not guaranteed to be first in the queue. Thus, all readers seeking the lock through this entry busy-wait on the entry's spin variable until it is reset (by the preceding entry in the queue).

In all three cases, the Arrive operation on the C-SNZI tree may fail if the tree is disabled by a writer. In this case, the reader simply restarts its lock acquire operation, which will place the reader after the competing writer.

When releasing the lock (procedure readerUnlock of FIG. 4C), a reader simply Departs from the C-SNZI tree in the node at which it Arrived. The snziDepart and snziDepartRoot operations are modified so that they report whether a waiting writer needs to be notified. This occurs when the last reader departs from the C-SNZI tree and the writeWanted bit is set in the SNZI root node. To prevent new readers from acquiring the lock using this node, the last reader atomically departs and disables the C-SNZI tree by setting the writeLocked bit when decrementing snziCount to zero.

When a writer releases the FIFO reader-writer lock, its queue entry is dequeued and reused. When a reader that has the lock finishes its work, however, its queue entry cannot be dequeued if other readers are still using the entry.

Therefore, when a reader terminates its critical section, it determines whether it is the last reader in that entry, and/or whether any other queue entries are waiting. If there are no other entries in the queue, then the reader entry can remain, regardless of whether the departed reader was the last reader. In this case, arriving readers can simply join the entry.

However, if the departing reader is the final reader (e.g., when a Query operation on the root node indicates that the surplus is zero), and another queue entry is waiting for the lock (e.g., the call to snziDepart returns true), then the entry will be dequeued and reused via the freeReaderNode procedure of FIG. 4A.

When a new reader entry is needed in the queue, procedure allocReaderNode of FIG. 4A is invoked. Part of this procedure involves initializing the root of the C-SNZI tree, which includes clearing the writeLocked bit, but only after the entry is successfully enqueued. If it were cleared before the entry was enqueued, a reader that used the entry before it was freed may have successfully Arrived at the entry's tree before the entry is part of the queue. Because the writeLocked bit is used to indicate whether a reader entry has been successfully enqueued after being recycled, the writerLock procedure of FIG. 4B waits until the writerLocked bit of its predecessor is false before continuing.

The allocReaderNode and freeReaderNode procedures of FIG. 4A reflect a node's memory pool wherein all reader nodes are linked together in a ring (i.e., a cyclic linked list). Each node can be in either a "Free" or "InUse" state, and each thread has a pointer to some reader node that it uses by default if available.

To allocate a node via allocReaderNode, a reader traverses the ring, starting from its default node, until it finds one that is in the Free state, and changes its state to InUse via a CAS operation. To free a node, the freeReaderNode procedure simply writes the node state to Free. Using this distributed algorithm for allocating and freeing nodes reduces the contention on the memory pool.

Figure 6:
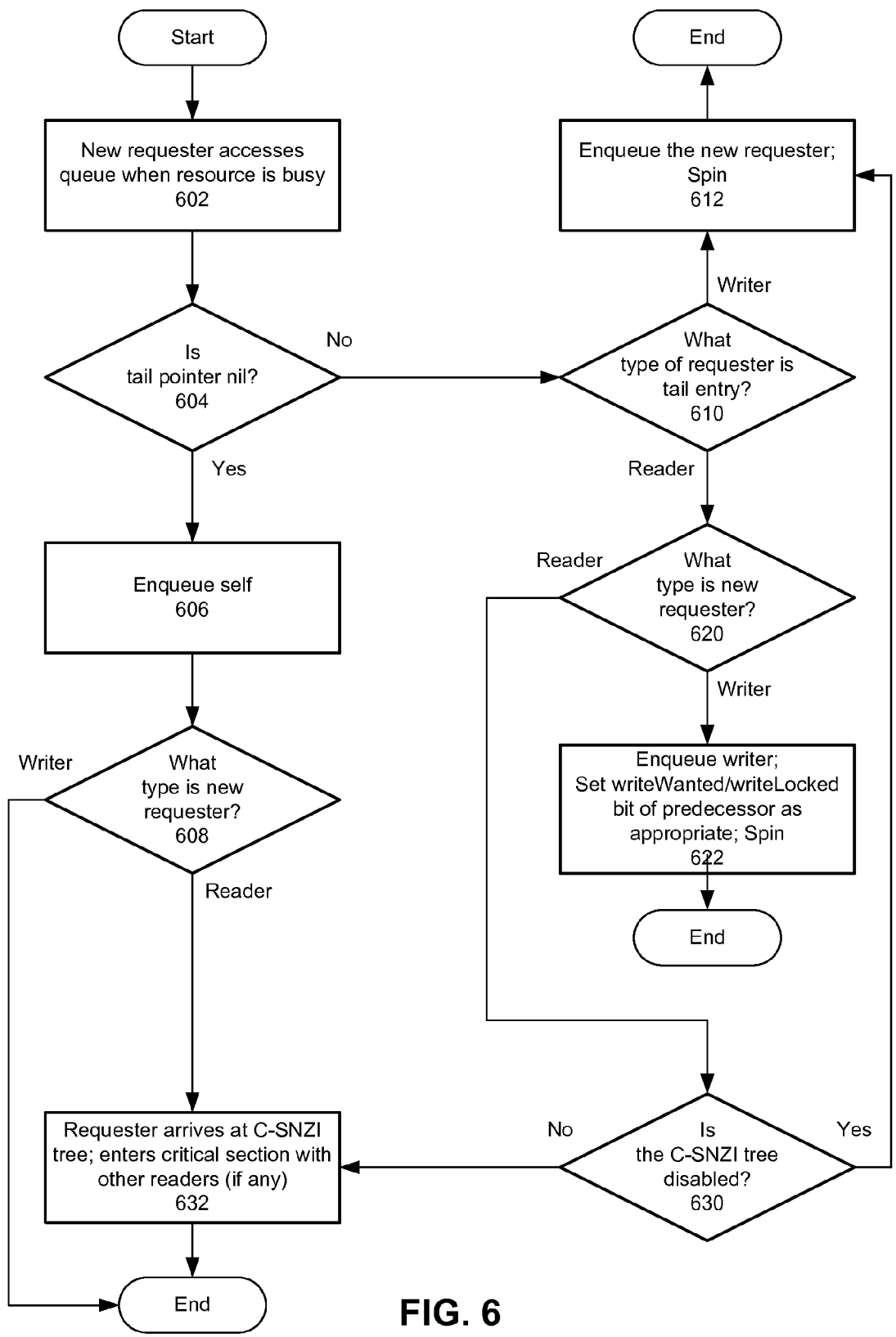
FIG. 6 is a flowchart demonstrating partial functioning of a FIFO reader-writer lock, according to an embodiment of the invention.

FIG. 6 is a flowchart demonstrating partial functioning of a FIFO reader-writer lock, according to an embodiment of the invention. The illustrated operations demonstrate how concurrent acquisition of the lock by multiple readers may be facilitated with the use of a hierarchical C-SNZI data structure. Other operations and methods may be derived from the preceding description.

In operation 602, a requester turns to a wait queue after finding a target resource that is controlled by the lock to be busy (i.e., contended).

In operation 604, the requester determines whether the tail pointer of the queue is nil, which signifies the queue is empty. If the tail pointer is nil, the illustrated method continues at operation 606; if the pointer is not nil, the method advances to operation 610.

In operation 606, the new requester enqueues itself at the tail of the queue. Note that if the attempt to enqueue itself fails (e.g., because of sudden contention), the requester may try again or return to operation 604.

In operation 608, if the new requester is a writer, the method ends, or may return to operation 602 to handle the arrival of another requester. If the new requester is a reader, the method advances to operation 632.

In operation 610, the queue is not empty (the tail pointer is not nil). Because the new requester may be able to join the tail entry (if it is a read entry and the requester is a reader), the type of requester at the tail is determined.

In operation 612, the tail entry is a writer. Because it cannot join the tail entry, the requester enqueues itself and spins on its spin variable until it is reset by the predecessor queue entry. If the attempt to enqueue itself fails (e.g., because of sudden contention), the requester may try again or return to operation 604. The illustrated method of the invention then ends, or may return to operation 602 to handle the arrival of another requester.

In operation 620, it is determined that a reader entry is at the tail of the queue, and so the new requester may be able to join it (if it is a reader). Therefore, the new requester's type is determined.

In operation 622, the new requester is a writer, and so it cannot join the reader entry currently at the tail. The new requester enqueues itself, then determines whether that reader entry currently has a surplus and proceeds accordingly. If the attempt to enqueue itself fails (e.g., because of sudden contention), the requester may try again or return to operation 604.

If the reader has a surplus, the new writer sets the writeWanted bit in the root node of the reader's C-SNZI structure and then spins on its own spin variable until it is reset by that reader.

If the reader does not have a surplus (i.e., all readers that joined that reader node have completed their critical sections), the writer disables the reader's C-SNZI structure by setting the writeLocked bit in the structure's root node. The writer then spins on the spin variable of the reader's node until it is reset by the predecessor of the reader.

After operation 622, the illustrated method of the invention ends, or may return to operation 602 to handle the arrival of another requester.

In operation 630, the new requester is a reader, and so it determines whether the C-SNZI structure of the tail reader entry is disabled (e.g., whether the writeWanted bit is set). If so, the new reader proceeds to operation 612 to enqueue itself and spin. Note that the tail entry C-SNZI structure may have been disabled while the new reader was examining the queue, before it could join the tail entry.

Otherwise, if the C-SNZI hierarchy is not disabled, in operation 632 the new reader performs an Arrive operation at a node in the hierarchy and can enter its critical section with any other reader(s) that arrived previously (and that have not departed, if the tail reader entry is also the head entry and therefore has acquired the lock). In some circumstances, as described previously, a reader may join the C-SNZI hierarchy by incrementing ssCount instead of performing an Arrive operation.

Reader-Preferred Reader-Writer Lock

In other embodiments of the invention, a reader-preferred reader-writer lock is provided to control access to a resource. As with the FIFO lock described above, the reader-preferred lock foregoes a lockword but comprises a queue. With a reader-preferred reader-writer lock, readers are permitted to overtake (e.g., skip) waiting writer entries in the queue to join a set of waiting readers that have not yet acquired the lock.

This type of lock therefore may be implemented when strict FIFO ordering is not required. Contention over the queue's tail pointer is reduced even further with a reader-preferred reader-writer lock, as compared to the FIFO reader-writer lock.

However, the wait queue is modified to utilize a doubly linked list, so that readers can traverse the queue from the tail toward the head. In some embodiments of the invention, while traversing the queue a new reader thread stops at the first reader entry that it finds and attempts to join that entry. In these embodiments, there can be only one reader entry in the queue with reader threads that have not yet acquired the lock.

Once found, the new reader checks the spin variable of the entry to ensure that the threads associated with the entry have yet to acquire the lock. If the spin variable is set, the thread joins the waiting readers by arriving at the C-SNZI tree and busy-waiting on the spin variable. If the spin variable is not set, the thread creates a new reader node and enqueues it at the tail of the queue.

In some other embodiments of the invention, readers may be characterized in some manner (e.g., priority, size of critical section or expected length of time needed to perform their reads). In these embodiments, arriving readers may only join (or create) entries configured for their class of reader, and so there may be more than two reader entries in the wait queue.

In some embodiments, another pointer is added to the lock object to identify the last known reader entry with threads still busy-waiting. The pointer is updated whenever an incoming reader finds such an entry, and is set to nil whenever a thread fails to join the entry. This optimization reduces the number of searches that need to be performed to find the last reader entry.

Figure 7:
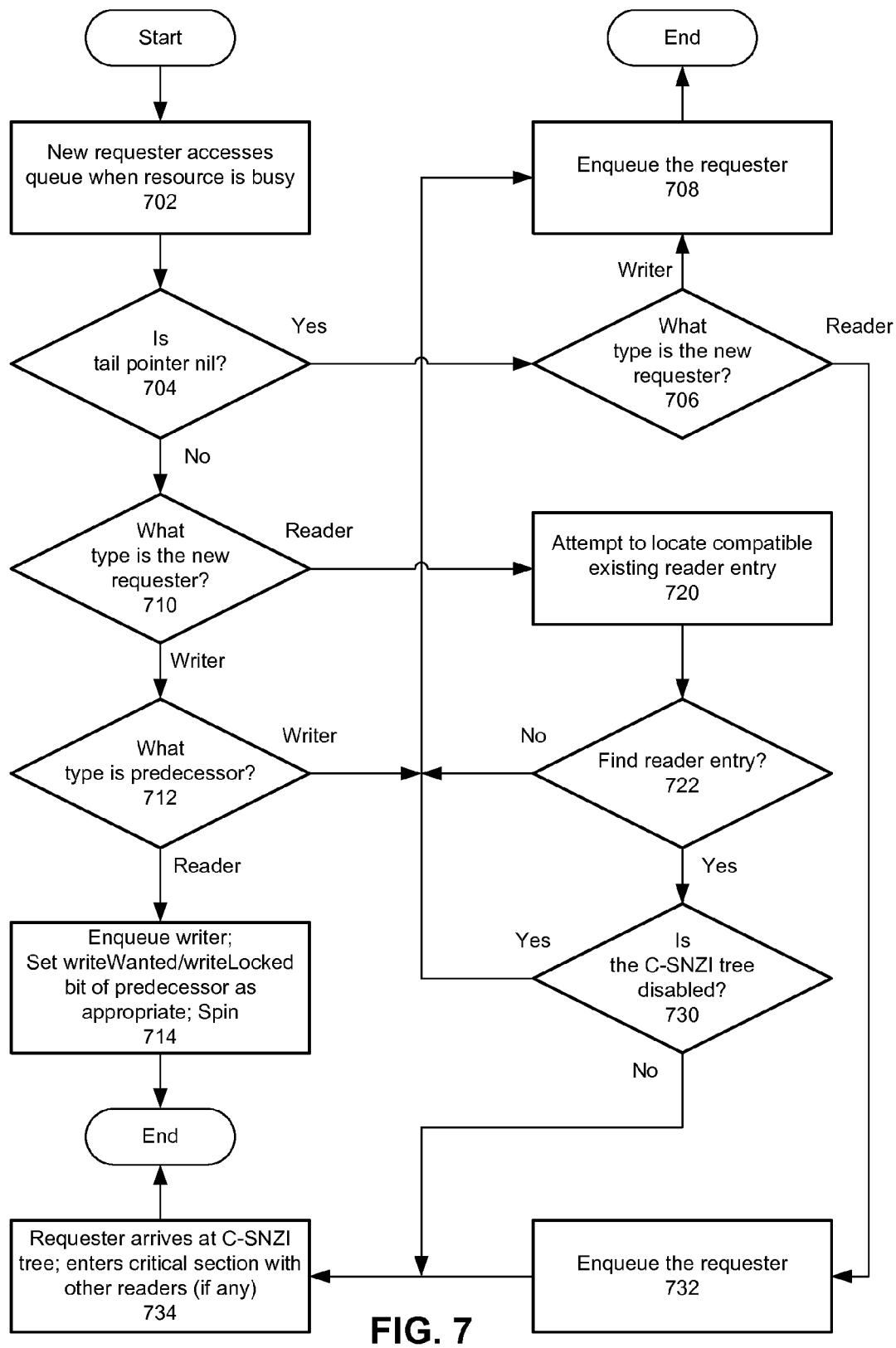
FIG. 7 is a flowchart demonstrating partial functioning of a reader-preferred reader-writer lock, according to an embodiment of the invention.

FIG. 7 is a flowchart demonstrating partial functioning of a reader-preferred reader-writer lock, according to an embodiment of the invention. The illustrated operations demonstrate how concurrent acquisition of the lock by multiple readers may be facilitated with the use of a hierarchical C-SNZI data structure. Other operations may be derived from the preceding description.

In operation 702, a requester turns to a wait queue after finding a target resource that is controlled by the lock to be busy (i.e., contended).

In operation 704, the requester determines whether the tail pointer of the queue is nil, which signifies the queue is empty. If the tail pointer is nil, the method continues at operation 706; otherwise, it advances to operation 710.

In operation 706, the type of access desired by the new requester is determined. If the new requester is a writer, the method continues at operation 708; otherwise, for a reader, the method advances to operation 732.

In operation 708, the new writer requester enqueues itself at the tail of the queue to await acquisition of the lock (if necessary). Note that if the attempt to enqueue itself fails (e.g., because of sudden contention), the requester may try again to enqueue itself, or may return to operation 704. The illustrated method of the invention then ends, or may return to operation 702 to handle the arrival of another requester.

In operation 710, the queue is not empty (the tail pointer is not nil). Because the new requester may be able to join an existing read entry (if it is a reader), the new requester's type of desired access is determined. If the requester is a writer, the method continues at operation 712; if it is a reader, the method advances to operation 720.

In operation 712, the new requester must take different action to join the queue depending on the type of requester that it will follow. Therefore, the previous requester's type is determined. If the preceding requester is a reader, the method continues at operation 714; otherwise, the method returns to operation 708. Note that in this case, and although not reflected in operation 708 in FIG. 7, the new reader will spin on its spin variable until it is reset by a preceding entry in the queue.

In operation 714, the new writer requester enqueues itself, and determines whether the reader entry that it now follows currently has a surplus, then proceeds accordingly. If the attempt to enqueue itself fails (e.g., because of sudden contention), the requester may try again or return to operation 704.

If the reader has a surplus, the new writer sets the writeWanted bit in the root node of the reader's C-SNZI structure and then spins on its own spin variable until it is reset by that reader.

If the reader does not have a surplus (i.e., all readers that joined that reader node have completed their critical sections), the writer disables the reader's C-SNZI structure by setting the writeLocked bit in the structure's root node. The writer then spins on the spin variable of the reader's node until it is reset by the predecessor of the reader.

After operation 714, the illustrated method of the invention ends, or may return to operation 702 to handle the arrival of another requester.

In operation 720, it is determined that the new requester is a reader. Because it may be able to join an existing reader entry in the queue, a search is made to find a compatible reader entry (i.e., one that the new requester can join).

As described above, this search may be as simple as examining a pointer or reference configured to identify a preceding reader entry (e.g., a reader entry that a previous new reader was able to join). Or, the search may involve traversing the queue (e.g., from the tail) to find a compatible reader entry. The search may be conducted in different manners in different implementations.

In operation 722, if a compatible reader entry is found, the illustrated method advances to operation 730. However, there may not be any other reader entry in the queue, or there may not be any other reader entry that is not already at the head of the queue. If no compatible reader entry was found, the method continues at operation 708, where the new requester enqueues a new reader entry at the tail of the queue. Note that in this case, and although not reflected in operation 708 in FIG. 7, the new reader will spin on its spin variable until it is reset by a preceding entry in the queue.

In operation 730, the new requester determines whether a C-SNZI structure of the identified pre-existing reader entry is disabled (e.g., whether the writeWanted bit is set). If the C-SNZI structure is not disabled, the method continues at operation 734; if the C-SNZI structure is disabled, the new reader proceeds to operation 708 to enqueue itself and wait. Note that in this case, and although not reflected in operation 708 in FIG. 7, the new reader will spin on its spin variable until it is reset by a preceding entry in the queue.

In some embodiments of the invention, multiple compatible reader entries may reside in the queue. In these embodiments, when a compatible entry is examined and found to be disabled, another one will be located and examined. In this case, only if all the compatible reader entries are disabled will the method proceed from operation 730 to operation 708.

In operation 732, the new reader enqueues itself as the first/only reader entry in the queue.

In operation 734 the new reader performs an Arrive operation at a node in the C-SNZI hierarchy and can enter its critical section with any other reader(s) that arrived previously or will arrive subsequently. In some circumstances, as described previously, a reader may join the C-SNZI hierarchy by incrementing ssCount instead of performing an Arrive operation. Note that the C-SNZI hierarchy that the requester joins may be within the queue entry it created via operation 732, or may be within a pre-existing reader entry discovered via operation 722.

Embodiments of the invention described here may be altered in various ways to achieve the same objective, without exceeding the scope of the invention. For example, the ssCount counter described above may be omitted in some embodiments of the invention, in favor of performing Arrive operations at the root of a C-SNZI structure.

In particular, instead of sampling incrementing an ssCount counter to enter its critical section, a reader requester performs the Arrive operation at the C-SNZI root. This will succeed in times of low contention and obviates any need to propagate a surplus upward through the structure. If an attempt to Arrive at the root node fails, the reader may instead attempt to Arrive at a non-root node.

The environment in which a present embodiment of the invention is executed may incorporate a general-purpose computer or a special-purpose device such as a hand-held computer. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of facilitating acquisition of a reader-writer lock by multiple readers, the method comprising:

constructing a hierarchical C-SNZI (Conditioned Scalable Non-Zero Indicator) structure within the lock, wherein a root node of the C-SNZI structure exposes an enable operation and a disable operation for enabling and disabling the C-SNZI structure;

joining multiple readers to the C-SNZI structure, wherein the multiple readers share acquisition of the lock while joined to the C-SNZI structure;

updating a surplus, which is configured to remain greater than zero as long as at least one of the multiple readers is joined to the C-SNZI structure;

setting a first flag in the C-SNZI structure in response to a request by a writer;

after setting of the first flag, prohibiting an additional reader from joining the C-SNZI structure; and setting a second flag when the writer acquires the lock.

2. The method of claim 1, wherein the C-SNZI structure comprises:

the root node; and a plurality of non-root nodes, wherein one or more non-root nodes expose:

an arrive operation invocable by a reader to join the C-SNZI structure; and a depart operation invocable by a reader to leave the C-SNZI structure, wherein the depart operation is invoked by readers that previously invoked the arrive operation.

3. The method of claim 1, wherein:

the reader-writer lock comprises a lockword and a queue; and the root node of the C-SNZI structure is included in the lockword.

4. The method of claim 3, wherein:

the queue is protected by a mutual exclusion lock; and a reader need not acquire the mutual exclusion lock in order to join the C-SNZI structure if the C-SNZI structure is not disabled.

5. The method of claim 3, further comprising:

when a final reader of the multiple readers leaves the C-SNZI structure, releasing the lockword if the queue is not empty.

6. The method of claim 3, wherein the C-SNZI structure comprises:

a plurality of non-root nodes; and the root node, said root node comprising:

a first counter configured to indicate whether more readers have arrived at the C-SNZI structure than have departed;

the first flag configurable to indicate that a writer is waiting to acquire the lock; and the second flag configurable to indicate that a writer has acquired the lock.

7. The method of claim 6, wherein said root node further comprises a third flag configurable to indicate that the queue is not empty.

8. The method of claim 6, wherein said root node further comprises a second counter configured to track a number of readers that have joined the C-SNZI structure without invoking an arrive operation on a node of the C-SNZI structure.

9. The method of claim 8, wherein:

one or more non-root nodes offer:

an arrive operation invocable by a reader to join the C-SNZI structure; and a depart operation invocable by a reader to leave the C-SNZI structure, wherein the depart operation is invoked by readers that previously invoked the arrive operation; and a given reader joins the C-SNZI structure by invoking the arrive operation on a non-root node in the presence of contention; or incrementing the second counter in the absence of contention.

10. The method of claim 1, further comprising:

determining whether only a single reader is joined to the C-SNZI structure; and if only a single reader is joined to the C-SNZI structure, upgrading the single reader to a writer.

11. The method of claim 1, wherein:

the reader-writer lock comprises a queue;

the C-SNZI structure is included in each reader entry in the queue; and the multiple readers have joined a first reader entry.

12. The method of claim 11, wherein the C-SNZI structure comprises:

a plurality of non-root nodes, wherein one or more of the non-root nodes offer:

an arrive operation invocable by a reader to join the C-SNZI structure; and a depart operation invocable by a reader to leave the C-SNZI structure, wherein the depart operation is invoked by readers that previously invoked the arrive operation; and the root node, said root node comprising:

a first counter configured to indicate whether more readers have invoked the arrive operation at the one or more non-root nodes of the C-SNZI structure than have invoked the depart operation;

the first flag configurable to indicate that a writer is waiting to acquire the lock; and the second flag configurable to indicate that a writer has acquired the lock.

13. The method of claim 11, wherein an additional reader may join the multiple readers that have joined the C-SNZI structure of the first reader entry only while the first reader entry is at a tail of the queue.

14. The method of claim 11, wherein an additional reader may join the multiple readers that have joined the C-SNZI structure of the first reader entry, unless:

the first reader entry is at a head of the queue; and a writer entry is enqueued.

15. The method of claim 11, further comprising:

configuring a pointer to identify a reader entry in the queue that an additional reader may join.

16. A non-transitory computer-readable medium storing instructions that, when executed by a computer, cause the computer to perform a method of facilitating acquisition of a reader-writer lock by multiple readers, the method comprising:

constructing a hierarchical C-SNZI (Conditioned Scalable Non-Zero Indicator) structure within the lock, wherein a root node of the C-SNZI structure exposes an enable operation and a disable operation for enabling and disabling the C-SNZI structure;

joining multiple readers to the C-SNZI structure, wherein the multiple readers share acquisition of the lock while joined to the C-SNZI structure; updating a surplus, which is configured to remain greater than zero as long as at least one of the multiple readers is joined to the C-SNZI structure;

setting a first flag in the C-SNZI structure in response to a request by a writer;

after setting of the first flag, prohibiting an additional reader from joining the C-SNZI structure; and setting a second flag when the writer acquires the lock.

17. A computing device, comprising:

a resource that is readable by read requesters and writable by write requesters; and a lock configured to arbitrate access to the resource by the read requesters and the write requesters, the lock including a conditioned scalable non-zero indicator (C-SNZI) object comprising:

a root node, wherein said root node comprises:

enable and disable logic for enabling and disabling the C-SNZI structure;

a first flag configurable to indicate that a write requester is waiting to acquire the lock; and a second flag configurable to indicate that a write requester has acquired the lock;

a set of non-root nodes, wherein one or more of the non-root nodes comprise:

arrive logic configured to join one or more read requesters to the C-SNZI object; and depart logic configured to sever a joined read requester from the C-SNZI object; and wherein read requesters joined to the C-SNZI object share acquisition of the lock;

wherein multiple read requesters invoke said arrive logic of different non-root nodes to join the C-SNZI object without contention; and wherein the lock is further configured to:

set the first flag in the C-SNZI structure in response to a request by a writer;

after setting of the first flag, prohibit an additional reader from joining the C-SNZI structure; and set the second flag when the writer acquires the lock.

18. The computing device of claim 17, wherein said root node of the C-SNZI object further comprises:

a first counter configured to indicate whether more read requesters have invoked the arrive operation at the one or more non-root nodes of the C-SNZI object than have invoked the depart operation.

* * * * *